Patented July 18, 1944

2,353,927

UNITED STATES PATENT OFFICE 2,353,927

CHEWING GUM MATERIAL

Oscar A. Pickett, Newark, Del., assignor to Hercules Powder Company, Wilmington, Del., a corporation of Delaware No Drawing. Application October 5, 1942, Serial No. 460,833

15 Claims. (Cl. 99—135)

This invention relates to chewing gum and more particularly it relates to chewing gum material containing as an essential ingredient certain elastomeric synthetic resins.

Chewing gum has largely been based on the use of chicle because of the desirable chewing characteristics of the chicle. However, chicle is expensive, not always available, and somewhat variable as are all natural products. Furthermore, chicle is not entirely satisfactory in its aging qualities.

A number of synthetic bases have been proposed to replace chicle. Most of them contain rubber, balata, one of the various guttas, factice, or similar resilient substances, a resinous component, a waxy substance, and sometimes a softener. The synthetic bases usually contain relatively highly unsaturated materials and have been poor in aging properties. In addition, they have been based on natural products which are variable and not always available.

It has been found in accordance with this invention that the disadvantages of previous chewing gums can be eliminated or considerably reduced by a chewing gum comprising a synthetic resin which is an elastomeric ester of a polyhydric alcohol and any polycarboxylic acid. The synthetic resin utilized is characterized by a resiliency or elasticity. Its properties are characteristically elastomeric.

The elastomeric ester is the essential ingredient of the chewing gum or chewing gum base in accordance with this invention and it provides chewing properties similar to those provided by chicle and the rubber-resin synthetic bases. Waxy materials, softeners and other modifiers may be compounded with the elastomeric ester to form a chewing gum base which may then be compounded with sugar and flavoring material in the usual fashion to form the finished chewing gum.

The elastomeric ester may be an ester of any polyhydric alcohol such as, for example, ethylene glycol, diethylene glycol, triethylene glycol, tetraethylene glycol, propylene glycol, glycerol, sorbitol and the like. The acid elements of the esters found particularly suitable are maleic adducts, i. e., addition reaction products of maleic acid or maleic anhydride, and rosin acids or esters of rosin acids or unsaturated terpenes. For example, the acid element may be a maleic adduct of a monohydric alcohol ester of a rosin acid such as methyl abietate, ethyl abietate, propyl abietate, methyl pimarate and the like; or a maleic adduct of polyhydric alcohol ester of a rosin acid such as the ethylene glycol ester, the glycerol ester, the diethylene glycol ester, and like esters of abietic acid or pimaric acid; or the maleic adduct of a modified rosin acid such as abietic acid, pimaric acid and the like either in a relatively pure form or in the form of ordinary rosin; or a maleic adduct of an unsaturated terpene, preferably an unsaturated monocyclic terpene hydrocarbon such as terpinolene, terpinene, dipentene, and the like. It will be appreciated that the maleic adduct is a polycarboxylic acid which may be prepared in the acid or acid anhydride form by condensation of maleic acid or maleic anhydride with the rosin acid, rosin acid ester or unsaturated terpene.

The esters utilized in accordance with this invention are synthetic resins prepared by esterifying a polyhydric alcohol with a polycarboxylic organic acid until an elastomeric product is obtained. They differ from the synthetic resins usually prepared by reacting polyhydric alcohols with polycarboxylic acids in that the usual synthetic resin of this nature is reacted only to a resinous state, care being taken to avoid the formation of an elastomeric form since such form is unsuitable in the usual uses of the resins and since it is rather close to the entirely unusable, insoluble and infusible gelled state. The elastomeric esters used in the present invention are esters which have been reacted to a soft gelled stage in which upon cooling the esters are characterized by the elastomeric nature, i. e., they return substantially to their original form upon being deformed to an extent materially in excess of that which would cause permanent deformation of the ordinary synthetic resins used in coatings and plastics. The present esters are reacted to the elastomeric stage by reacting them at higher than normal resin preparing temperatures until their cure time is quite short and discontinuing the reaction before the esters reach an infusible, insoluble state. The examples following illustrate the preparation of elastomeric esters suitable for the chewing gum according to this invention.

*Example 1*

Diethylene glycol in a quantity of 1480 parts by weight was reacted with 2000 parts by weight of a condensate of terpinolene with maleic anhydride, the condensate having an acid number of 473. The two ingredients were reacted at a temperature of 240° C. for a period of 6 hours in a carbon dioxide atmosphere, under reflux provided by a steam jacketed condenser. At the end of this period, the acid number of the resin was 30 and the cure time was 80 seconds. The temperature of the reaction mixture was then lowered to 220° C. and a vacuum of 15 mm. of mercury absolute was applied for a period of 30 minutes to remove any volatile by-products. The product was a rubbery, tack-free ester having a melting point by the drop method of 76° C., an acid number of 20, a Lovibond color of 21 Amber, and a cure time of 25 seconds.

*Example 2*

Triethylene glycol in a quantity of 1780 parts by weight was reacted with 2200 parts of a condensate of terpinolene and maleic anhydride, the condensate having an acid number of 530. The two materials were reacted for 11 hours at 265° C. in a carbon dioxide atmosphere under reflux provided by a steam jacketed condenser. During the final 30 minutes of reaction, the reaction mixture was subjected to a vacuum of 15 mm. of mercury absolute to remove volatile materials. The product obtained on cooling was a soft tacky elastomeric resin having considerable film strength, a melting point by the drop method of 41° C., a Lovibond color of 16 Amber, an acid number of 16 and a cure time of 60 seconds.

*Example 3*

In this example, the maleic adduct was prepared in the latter portion of the esterification reaction. Two thousand nine hundred and forty parts of ethylene glycol and 3880 parts by weight of maleic anhydride were heated to 200° C. and held at that temperature for 1½ hours. At this time 12,670 parts by weight of methyl abietate were added and the resulting mixture was heated to 270° C. It was held at 270° C. until the acid number dropped to 15. The reaction mixture was then sparged with carbon dioxide at 270° C. for ¾ hour to obtain a cure time of about 20 seconds. The elastomeric ester so obtained was then cooled.

*Example 4*

Diethylene glycol in a quantity of 4350 parts by weight and 3880 parts by weight of maleic anhydride were heated to 200° C. and held at that temperature for 1½ hours. Twelve thousand six hundred seventy parts by weight of methyl abietate were then added. The resulting reaction mixture was then heated to 270° C. and held at that temperature until the acid number had dropped to 15. The reaction mixture was then sparged at 270° C. for ¾ hour during which the cure time of the product dropped to 18 seconds. The elastomeric ester product was then cooled.

The elastomeric esters vary somewhat in softness and melting point. They are usually formulated by compounding with waxes, softeners, and perhaps other modifiers to form chewing gum bases of the particular consistency and softness desired. A particularly suitable method of obtaining the desired consistency and softness in the chewing gum base comprises blending two elastomeric esters of different softness in compounding the base.

Some typical illustration of the preparation of chewing gum bases in accordance with this invention are given in the following examples. It will be understood that the examples are merely illustrative and not limiting.

*Example 5*

The elastomeric ester of ethylene glycol and the maleic adduct of methyl abietate prepared as described in Example 3 was mixed with the elastomeric ester of diethylene glycol and the maleic terpene adduct prepared as described in Example 1 in the proportion of 75% of the first elastomer and 25% of the second elastomer by heating these two materials together until a homogeneous melt was obtained with stirring. Fifteen parts of hydrogenated methyl abietate were then stirred into 85 parts by weight of the melted mixture of elastomer. The resulting mixture was stirred until uniform and cooled to form the chewing gum base. The gum base was found to be inert and stable and suitable for the preparation of finished gum by kneading in sugar and flavoring matter.

*Example 6*

A mixture of elastomeric esters was prepared by melting together the elastomeric ester of ethylene glycol and the maleic adduct of methyl abietate described in Example 3 with the elastomeric ester of triethylene glycol and the maleic terpene adduct described in Example 2 in the proportion of 65% by weight of the first material and 35% by weight of the second. Ninety parts of the elastomeric mixture were compounded with 10 parts by weight of hydrogenated methyl abietate, 5 parts by weight of carnauba wax, 20 parts of sucrose, 2 parts by weight of vanilla extract, and 10 parts by weight of a crystalline adduct of maleic anhydride and wood rosin which was prepared by reacting maleic anhydride and wood rosin in the presence of iodine as a catalyst in a petroleum hydrocarbon solvent reaction medium. The ingredients of the chewing gum made were compounded by warming the mixture until it was substantially liquid, stirring the ingredients until the mixture became smooth. It was then cooled.

*Example 7*

A mixture consisting of 75% of the elastomeric ester of ethylene glycol and the maleic adduct of methyl abietate and 25% of the elastomeric ester of diethylene glycol and terpene maleic adduct was prepared in the manner described in Example 5. Ninety parts by weight of this mixture were compounded with 10 parts by weight of triethyl citrate and 5 parts by weight of carnauba wax by heating the ingredients until substantially molten and stirring them until homogeneous. The mixture was then cooled to form the chewing gum base.

*Example 8*

A mixture of elastomeric esters was prepared in the manner described in Examples 5 and 7. To 75 parts by weight of molten elastomeric mixture there were added 25 parts by weight of hydrogenated methyl abietate and 5 parts of carnauba wax. The mixture was stirred until homogeneous and cooled.

*Example 9*

A mixture consisting of equal parts of the elastomeric ester of ethylene glycol and the maleic adduct of methyl abietate described in Example 3 and the elastomeric ester of diethylene glycol and the maleic adduct of methyl abietate described in Example 4 was prepared by heating the two materials together until liquid and stirring. Forty parts of this mixture, 7 parts of the elastomeric ester of diethylene glycol and the terpene maleic adduct described in Example 1, 2.5 parts of carnauba wax, and 1 part of oil of peppermint were compounded by stirring the mixture in the melted state until uniform and then cooling to form the chewing gum base.

*Example 10*

In this example a complex chewing gum base was prepared by compounding 10 parts by weight of the elastomeric soft resinous ester prepared by esterifying triethylene glycol with the maleic adduct of terpinolene as described in Example 2 with 15 parts of crepe rubber, 25 parts of gum chicle, 15 parts of hydrogenated glycerol rosin ester, and 15 parts of stearic acid. The compounding was accomplished by dissolving the gum chicle and rubber in the elastomeric ester while warming to a temperature of 125° C. and stirring. The hydrogenated glycerol rosin ester and the stearic acid were added when the mixture reached 125° C. As soon as the base was uniform, it was permitted to cool. The base was convertible into chewing gum by incorporation of sugar, filling material and flavoring in the usual manner.

As indicated by the examples, modification of the elastomeric esters with a softener or a waxy substance is usually desirable to obtain the desired chewing properties in the chewing gum base. Although softeners are not in all cases necessary usually a softener such as hydrogenated methyl abietate, triethyl citrate, acetyl triethyl citrate, mineral oil, glycerine, sorbitol solutions, and the like is incorporated. Likewise, although a waxy substance is not always essential there will usually be included in the chewing gum base a waxy material which may be a true wax such as paraffin wax, carnauba wax, bayberry wax, candelilla wax, and the like or a waxy material having the unctuous feel characteristic of the waxes, for example, stearic acid, stearyl alcohol, ethylene glycol stearate, and the like.

The incorporation of a resin in chewing gum bases containing the elastomeric esters used in the present invention is unnecessary. However, where a chewing gum base appears more resiliently elastic than is desired, a resinous component such as hydrogenated rosin, hydrogenated glycerol ester of rosin, hydrogenated coumarone resin, and the like may be added. If desired, other materials modifying the chewing characteristics may be included. For example, a crystalline material such as the crystalline adduct of maleic anhyride and abietic acid or other wood rosin acid may be incorporated to impart the effect of crunchiness to the chewing gum.

The chewing gum base may also include fillers such as powdered charcoal, precipitated chalk, magnesium carbonate, calcium sulphate, colloidal clays, and the like. The base may also include flavoring matter but, as a rule, flavoring matter will be incorporated with sugar in converting the chewing gum base to the finished chewing gum product.

The chewing gum base may consist essentially of the elastomeric ester with small amounts of modifiers such as waxes or softeners or the base may consist of a mixture of the elastomeric ester with gum chicle or with synthetic base ingredients such as rubber, balata, resinous modifiers and the like. Thus, the elastomeric ester used in accordance with this invention finds application as an extender of gum chicle or other base materials.

The chewing gum base may be prepared from the elastomeric ester by stirring in the various ingredients while heating to a temperature at which the materials are substantially liquid. The base may also be prepared by milling together the ingredients on a roll mill preferably at a slightly elevated temperature at which they work easily. Chewing gums may be prepared from the bases by the same method. Preferably the sugar, flavoring materials and fillers are milled into the gum base material on a roll mill at a slightly elevated temperature.

The gum bases according to the present invention are bland and inert. They readily take up the usual sugars and flavoring matter incorporated in chewing gum. Because of their inertness, they may be flavored with materials which are incompatible with chicle, for example, cocoa may be included in the chewing gum.

Chewing gum and chewing bases in accordance with the present invention have the advantage of high stability and long life. The ingredients are all substantially saturated in nature and hence do not change or deteriorate materially on long aging. The esters are polymerized to a high degree in their preparation and do not change by further polymerization or by setting up to hard masses. Gums and gum bases prepared therefrom are not dependent upon natural products and hence may be made with very high uniformity.

Cure time as utilized herein is the time required for a drop of resin or elastomer to reach an infusible, insoluble state when placed on a hot plate at 200° C. The elastomeric esters used in the chewing gum according to this invention are preferably reacted to a cure time of between about 10 and about 30 seconds.

What I claim and desire to protect by Letters Patent is:

1. A chewing gum comprising an elastomeric ester of a polyhydric alcohol and a maleic adduct of an unsaturated cyclic material selected from the group consisting of monohydric esters of rosin acids and unsaturated terpenes and a modifier selected from the group consisting of waxes and softeners.

2. A chewing gum comprising an elastomeric ester of a polyhydric alcohol and a maleic adduct of a monohydric alcohol ester of a rosin acid and a modifier selected from the group consisting of wax and softeners.

3. A chewing gum comprising an elastomeric ester of a polyhydric alcohol and a maleic adduct of an unsaturated terpene and a modifier selected from the group consisting of waxes and softeners.

4. A chewing gum comprising an elastomeric ester of diethylene glycol and a maleic adduct of a methyl ester of a rosin acid and a modifier selected from the group consisting of waxes and softeners.

5. A chewing gum comprising an elastomeric ester of diethylene glycol and the maleic adduct of methyl abietate and a modifier selected from the group consisting of waxes and softeners.

6. A chewing gum comprising an elastomeric ester of diethylene glycol and a maleic adduct of a monocyclic terpene hydrocarbon and a modifier selected from the group consisting of waxes and softeners.

7. A chewing gum comprising an elastomeric ester of triethylene glycol and a maleic adduct of a monocyclic terpene hydrocarbon and a modifier selected from the group consisting of waxes and softeners.

8. A chewing gum comprising an elastomeric ester of a polyhydric alcohol and a maleic adduct of a monohydric alcohol ester of a rosin acid and a waxy substance.

9. A chewing gum comprising an elastomeric ester of a polyhydric alcohol and a maleic adduct of an unsaturated terpene and a waxy substance.

10. A chewing gum comprising an elastomeric ester of a polyhydric alcohol and a maleic adduct of a monohydric alcohol ester of a rosin acid and gum chicle.

11. A chewing gum comprising an elastomeric ester of a polyhydric alcohol and a maleic adduct of an unsaturated terpene and gum chicle.

12. A chewing gum comprising an elastomeric ester of a polyhydric alcohol and a maleic adduct of an unsaturated cyclic material from the group consisting of monohydric esters of rosin acids and unsaturated terpenes and a waxy substance.

13. A chewing gum comprising an elastomeric ester of a polyhydric alcohol and a maleic adduct of an unsaturated cyclic material from the group consisting of monohydric esters of rosin acids and unsaturated terpenes and gum chicle.

14. A chewing gum comprising an elastomeric ester of diethylene glycol and the maleic adduct of methyl abietate and a wax.

15. A chewing gum comprising an elastomeric ester of a polyhydric alcohol and a maleic adduct of a monohydric alcohol ester of a rosin acid and a modifier selected from the group consisting of waxes and softeners.

OSCAR A. PICKETT.